No. 747,986. PATENTED DEC. 29, 1903.
L. L. LAYNE.
PITCHFORK.
APPLICATION FILED SEPT. 1, 1903.
NO MODEL.
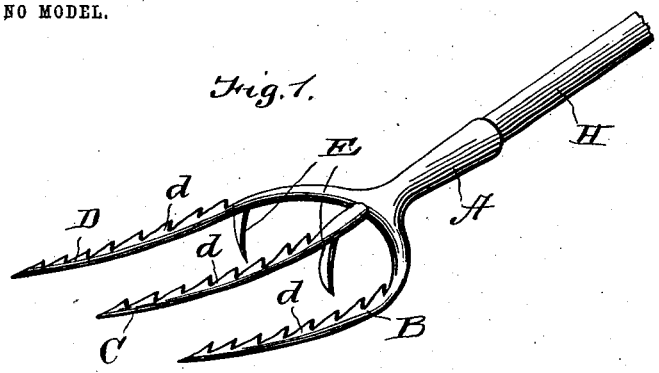
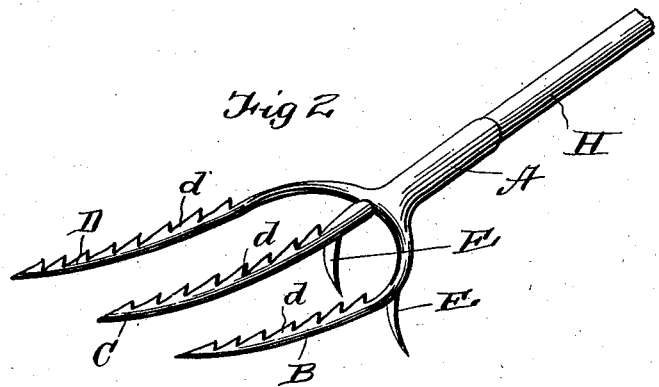
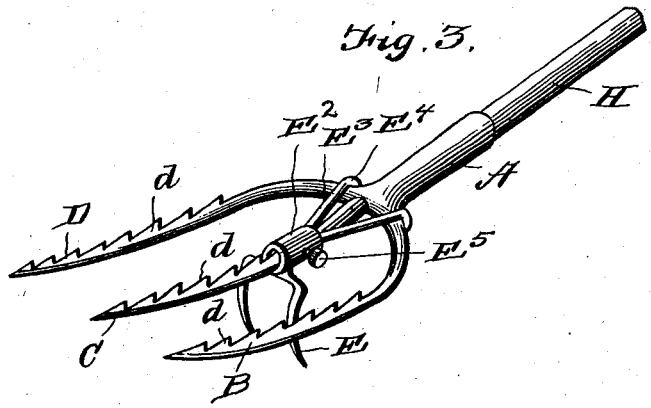

No. 747,986.                                           Patented December 29, 1903.

UNITED STATES PATENT OFFICE.

LEROY L. LAYNE, OF GOLDEN CITY, MISSOURI.

PITCHFORK.

SPECIFICATION forming part of Letters Patent No. 747,986, dated December 29, 1903.

Application filed September 1, 1903. Serial No. 171,554. (No model.)

*To all whom it may concern:*

Be it known that I, LEROY L. LAYNE, a citizen of the United States, residing at Golden City, in the county of Barton and State of Missouri, have invented certain new and useful Improvements in Pitchforks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in pitchforks; and it relates more specifically to that class of forks which are designed for use in loading grain after the same has been bound into sheaves; and the invention has for its object the provision of a pitchfork provided with novel means whereby the hay or grain may be held upon the fork while the same is being raised and whereby the fork may be readily freed when the hay or grain has been elevated by merely raising the tines, so that the hooks or spurs provided upon the tines of the fork may be disengaged.

The invention has for a further object the provision of a fork of the character described in which rearwardly-projecting tines or spurs are provided, the same being so arranged as to serve to hold the hay or grain and prevent the same from sliding off the tines, said prongs or projections, which are preferably extended downwardly and rearwardly from the tines of the fork, being especially designed for use in pulling the sheaves into place before inserting the tines of the fork.

To these ends and to such others as the invention may pertain the same consists in the novel features of construction and in the peculiar combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, like letters of reference indicating the same parts throughout the several views, and in which drawings—

Figure 1 is a perspective view of a left-hand fork embodying the features of my invention. Fig. 2 is a like view of a right-hand fork; and Fig. 3 is a perspective view of a modified form of the fork, in which the rearwardly and downwardly projecting prongs are shown as detachably connected with the fork.

Reference now being had to the details of the drawings by letter, A designates the head of the fork, which in the drawings is illustrated as having three tines, the same being indicated by letters B, C, and E, each of which tines is provided with corrugations $d$, which extend rearward in order to provide means for holding the hay or grain upon the fork, and said corrugations extend over a part of the length of each tine, and depending from the lower or rear surface of one or more of the tines are provided spur hooks or projections E, which extend downward and are slightly curved rearwardly, while a portion of the tines intermediate the spurs and shank portion of the fork are free from corrugations, and a suitable handle H is secured within the socket of the shank portion of the fork.

In Fig. 1 of the drawings I have shown the spurs E arranged upon two of the tines, adapting the fork for the use of a left-hand workman, while in Fig. 2 the spurs are shown upon the tines which best adapt the fork for the use of a right-handed workman.

In Fig. 3 of the drawings I have shown a means whereby the tines E are detachably connected with the central tine of a fork, so that in case for any reason it is desired to use the fork without these tines this may readily be accomplished by simply removing the spurs. In this construction the tines E are cast integral with a hollow cylindrical body portion $E^2$, to one end of which are integrally secured the rods $E^3$, provided at their free ends with hooks $E^4$.

When it is designed to attach the spurs to the hook, it is simply necessary to pass the cylindrical body portion $E^2$ over a central tine of the hook and cause the hook ends $E^4$ of the rods $E^3$ to engage the outer edges of the base portion of the tines, as shown in Fig. 3 of the drawings. When the device has been thus placed upon the fork, it is secured in position by means of a set-screw $E^5$.

From the foregoing description of the invention the use of the device will be readily understood. It will be seen that when it is designed to bunch grain or hay together preliminary to loading with the use of the fork the tines E will serve as a rake for this purpose, and it will also be noted that the use of these spurs in pulling together grain that has been sheaved will be particularly advantageous. It will be noted that the hay or grain that is raised by the fork will be held by the tines or spurs until the same has been elevated, after which by raising the tines slightly the spurs will be disengaged.

Having thus fully described my invention, what I claim as new, and desire to secure by Letters Patent, is—

1. A pitchfork having tines with rearwardly-projecting corrugations extending over a portion of the length of the tines, and having rearwardly-extending spurs carried by the tines of the fork, substantially as and for the purpose specified.

2. A pitchfork having its tines provided with a series of corrugations and having one or more downward and rearwardly extending spurs attached to the tines, substantially as described and for the purpose specified.

3. A pitchfork having tines provided with series of corrugations, a collar carried on one of said tines having spurs projecting therefrom, as set forth.

4. A pitchfork having tines provided with a series of corrugations, a collar fitted to one of said tines and provided with spurs which project away from the tines, hooks fastened to said collar and adapted to engage over the shank portions of two of the tines, and a thumb-screw for holding said collar in place, as set forth.

In testimony whereof I hereunto affix my signature in presence of two witnesses.

LEROY L. LAYNE.

Witnesses:
G. W. VINCENT,
W. R. JEWELL.